(12) United States Patent
Ellison

(10) Patent No.: US 7,828,372 B2
(45) Date of Patent: Nov. 9, 2010

(54) MOUNTING ARRANGEMENT FOR MOUNTING CLADDING TO VEHICLE BODY

(75) Inventor: Terrie Ellison, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/138,363

(22) Filed: Jun. 12, 2008

(65) Prior Publication Data

US 2009/0309388 A1 Dec. 17, 2009

(51) Int. Cl.
*B60R 13/02* (2006.01)
(52) U.S. Cl. ................ 296/191; 296/1.08; 24/297; 24/457; 24/458
(58) Field of Classification Search ........... 296/191, 296/1.08; 24/297, 453, 457, 458
See application file for complete search history.

(56) References Cited

U.S. PATENT DOCUMENTS

| | | | |
|---|---|---|---|
| 3,310,929 A | 3/1967 | Garvey | |
| 4,103,400 A * | 8/1978 | Munse | 24/304 |
| 4,363,839 A | 12/1982 | Watanabe et al. | |
| 4,388,355 A | 6/1983 | Ikemizu | |
| 4,592,937 A * | 6/1986 | Nagata et al. | 428/31 |
| 4,630,338 A | 12/1986 | Osterland et al. | |
| 5,098,765 A * | 3/1992 | Bien | 428/134 |
| 5,217,337 A * | 6/1993 | Junemann et al. | 411/45 |
| 5,222,852 A * | 6/1993 | Snyder | 411/553 |
| 5,320,151 A | 6/1994 | Wumer | |
| 5,353,571 A * | 10/1994 | Berdan et al. | 52/716.5 |
| 5,580,204 A * | 12/1996 | Hultman | 411/509 |
| 5,722,124 A | 3/1998 | Wisniewski | |
| 5,774,949 A | 7/1998 | Cornell et al. | |
| 6,000,107 A * | 12/1999 | West | 24/453 |
| 6,095,594 A | 8/2000 | Riddle et al. | |
| 6,324,731 B1 * | 12/2001 | Pliml, Jr. | 24/453 |
| 6,431,585 B1 * | 8/2002 | Rickabus et al. | 280/728.3 |
| 6,634,693 B2 * | 10/2003 | Straesser, Jr. | 296/70 |
| 6,722,730 B2 | 4/2004 | Lydan et al. | |
| 6,824,201 B2 | 11/2004 | Miyazaki | |
| 6,863,327 B2 | 3/2005 | Granger et al. | |
| 6,918,162 B2 | 7/2005 | Bodo | |
| 6,959,954 B2 | 11/2005 | Brandt et al. | |
| 7,040,682 B2 * | 5/2006 | Tokumoto et al. | 296/1.08 |
| 7,096,638 B2 | 8/2006 | Osterland et al. | |
| 2003/0102693 A1 * | 6/2003 | Lydan et al. | 296/191 |
| 2004/0061348 A1 | 4/2004 | Takeda et al. | |
| 2005/0116485 A1 * | 6/2005 | Kuroda | 296/1.08 |
| 2006/0032030 A1 * | 2/2006 | Nessel et al. | 24/289 |

* cited by examiner

*Primary Examiner*—Patricia L Engle
(74) *Attorney, Agent, or Firm*—Mark E. Duell; Rankin Hill & Clark LLP

(57) ABSTRACT

A vehicle cladding mounting arrangement and method for securing a cladding panel to a vehicle body include a plastic body cladding having a main panel portion and an integrally formed cladding clip structure extending from the main panel portion and a plastic support bracket having a body portion for overlaying the main panel portion of the body cladding and an integrally formed bracket clip structure extending from the body portion. A vehicle body defines a mounting aperture. The integrally formed bracket clip structure is received in the mounting aperture. The integrally formed cladding clip structure is also received in the mounting aperture.

17 Claims, 4 Drawing Sheets

MOUNTING ARRANGEMENT FOR MOUNTING CLADDING TO VEHICLE BODY

BACKGROUND

The present disclosure generally relates to the mounting of cladding to an exterior of a vehicle body and more particularly relates to an improved mounting arrangement for securing cladding to the vehicle body. In one embodiment, a vehicle cladding mounting arrangement includes a plastic body cladding having an integrally formed cladding clip structure extending from a main panel portion, a plastic support bracket having an integrally formed bracket clip structure extending from a body portion, and a vehicle body defining a mounting aperture that receives the bracket clip structure and the cladding clip structure therein. The improved mounting arrangement will be described with particular reference to this embodiment, but it is to be appreciated that it is also amenable to other like applications.

Many vehicles include a cladding, such as a molded plastic cladding, attached to an exterior of the vehicle's body, such as a sheet metal vehicle body. For example, a cladding in the form of a panel can be attached to the vehicle body in a quarter panel area thereof for purposes of enhancing the vehicle's appearance. One often employed means for attaching the cladding to the vehicle body is to incorporate a molded-in or integral clip or attachment structure into the cladding that can be secured, sometimes releasably, within an aperture provided in the vehicle body. For example, a cladding panel could have a plurality of molded-in attachment structures extending from an inside or interior surface of the cladding and releasably received in corresponding apertures defined in the vehicle body for mounting the cladding to the vehicle body.

Sometimes a secondary component is used to mount or at least assist in mounting the cladding to the vehicle body. For example, one or more brackets can be used to mount or hang a cladding onto the vehicle body. These brackets can include a body portion that overlays a portion of a cladding panel for positioning and/or supporting the cladding panel relative to the vehicle body and a mounting or hanging means for connecting the cladding to the bracket. The bracket's body portion can be generally planar or can have a contour that generally matches that of the cladding panel, or at least the portion of the cladding panel that the bracket's body portion overlays. The bracket can further include its own one or more molded-in or integral clips or attachment structures that can be secured, sometimes releasably, within corresponding apertures provided in the vehicle body to secure the bracket to the vehicle body and thereby secure the cladding, when mounted or hung to the bracket, to the vehicle body.

Should both the cladding and a bracket used in association with the cladding include respective molded-in or integral clip or attachment structures, the vehicle body may be required to include separate holes at the attachment area or location for each of the clips of the cladding and the bracket (i.e., a first aperture or hole will need to be provided for each molded-in clip on the cladding and a second, separate aperture or hole will need to be provided for each molded-in clip on the bracket). This is counter to the general desire to limit the number of holes or apertures provided in a vehicle body, particularly a sheet metal-type vehicle body, for purposes of maintaining the strength, rigidity and/or overall integrity of the vehicle body, as well as to maintain production efficiencies in providing a vehicle body and securing a cladding thereto.

SUMMARY

According to one aspect, an improved vehicle cladding mounting arrangement is provided. More particularly, in accordance with this aspect, the vehicle cladding mounting arrangement includes a plastic body cladding having a main panel portion and an integrally formed cladding clip structure extending from the main panel portion. The vehicle cladding mounting arrangement further includes a plastic support bracket having a body portion for overlaying the main panel portion of the body cladding and an integrally formed bracket clip structure extending from the body portion. A vehicle body defines a mounting aperture that receives the integrally formed bracket clip structure therein and further receives the integrally formed cladding clip structure therein.

According to another aspect, a double-clip mounting arrangement is provided for securing a cladding to a vehicle body. More particularly, in accordance with this aspect, the double-clip mounting arrangement includes a cladding panel having an integrally molded cladding clip structure. A support bracket overlays the cladding panel and has an integrally molded bracket clip structure. The cladding clip structure is receivable within a receiving cavity defined in the bracket clip structure. A vehicle body has a mounting aperture into which the bracket clip structure is receivable for securing the cladding panel to the vehicle body when the cladding clip structure is in the receiving cavity of the bracket clip structure.

According to still another aspect, a method of securing a cladding panel to a vehicle body is provided. More particularly, in accordance with this aspect, a plastic body cladding with a main panel portion and an integrally molded cladding clip structure extending from the main panel portion is provided. A plastic support bracket is provided having a body portion, an integrally molded bracket clip structure extending from an inside surface of the body portion, and a receiving cavity having one end defined in an outside surface of the body portion and extending through the body portion into the bracket clip structure. The cladding clip structure is inserted into the receiving cavity. The bracket clip structure is inserted into a mounting aperture defined in a vehicle body to secure the cladding panel to the vehicle body.

DETAILED DESCRIPTION

Figure 1:
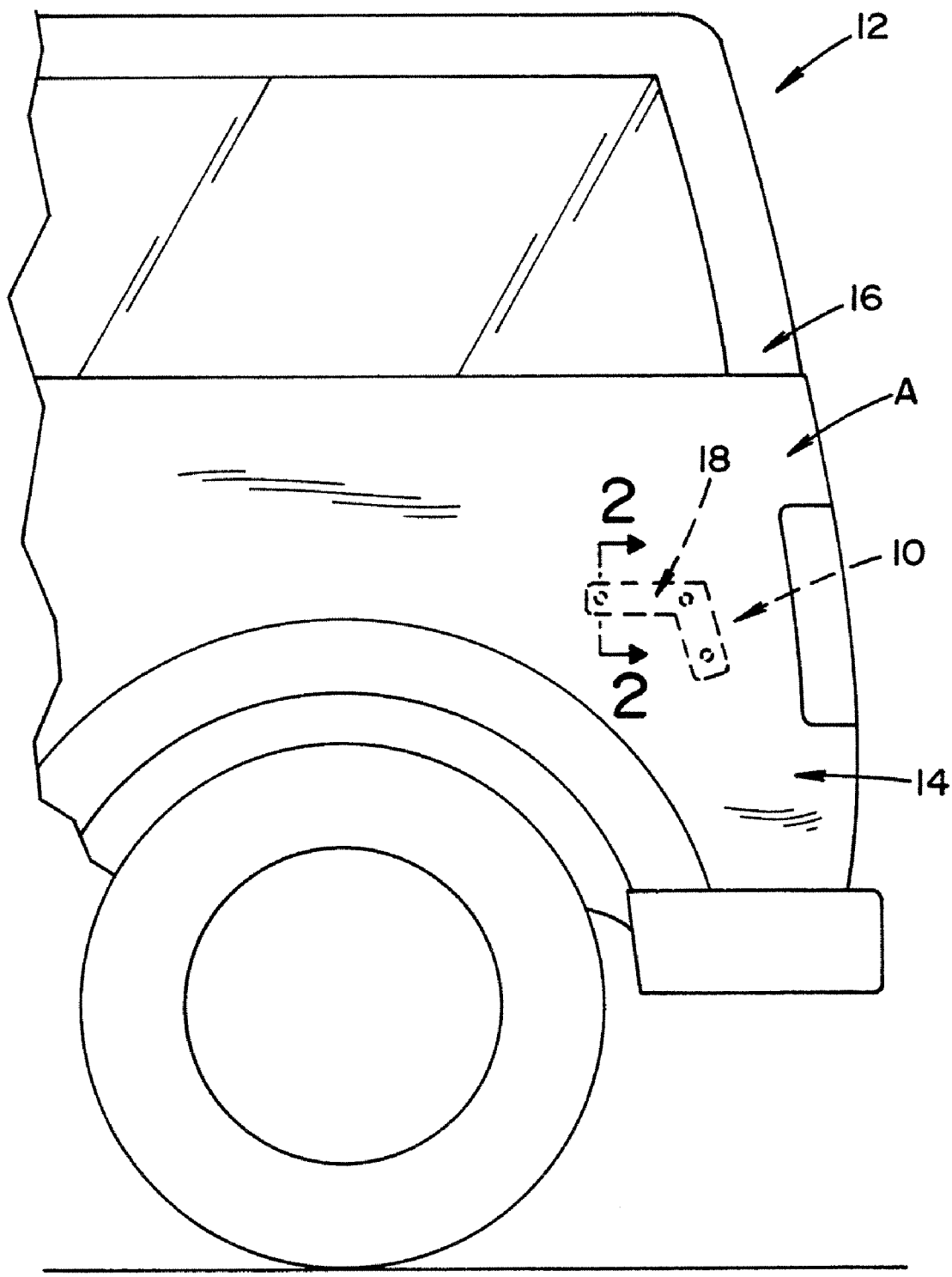
FIG. 1 is a partial elevational view of a vehicle employing an improved vehicle cladding mounting arrangement for securing a cladding to a vehicle body, wherein a support bracket is used to mount the cladding to the vehicle body.

Referring now to the drawings, wherein the showings are for purposes of illustrating one or more exemplary embodiments, FIG. 1 shows a vehicle cladding mounting arrangement 10 on a vehicle 12 for mounting or securing a body cladding 14 to a body 16 of the vehicle 12 (i.e., a vehicle body). The mounting arrangement 10 includes the body cladding 14 mounted to the vehicle body 16 with or by a support bracket 18. More particularly, and as will be described in more detail below, the support bracket 18 can be used to position or mount the cladding 14 onto the vehicle body 16 and provide a desired spacing between the cladding 14 and the vehicle body 16. For reasons that will become apparent to those skilled in the art upon reading the present disclosure, the illustrated mounting arrangement 10 can also be referred to as a double-clip mounting arrangement.

Figure 2:
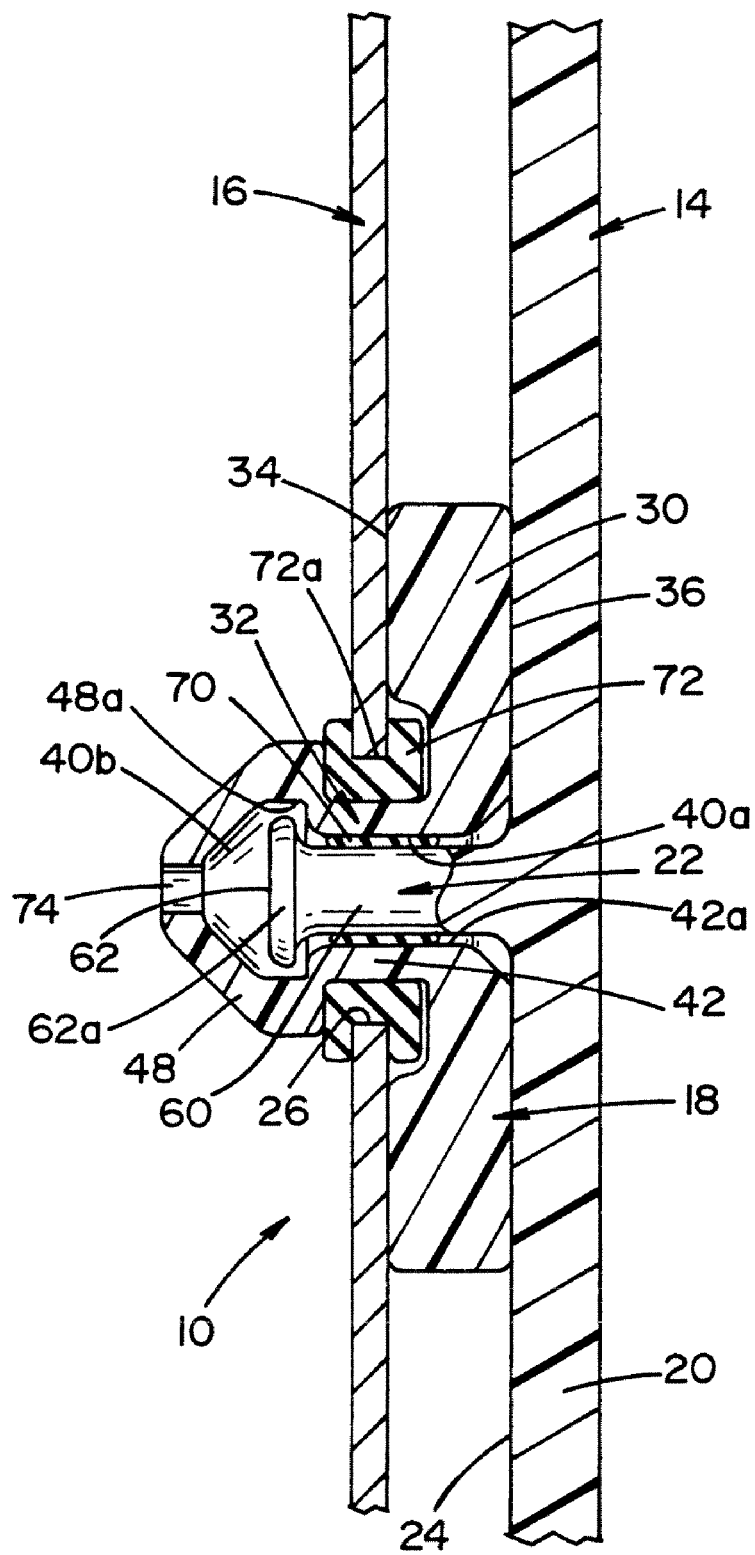
FIG. 2 is a cross sectional view of the mounting arrangement taken along the line 2-2 of FIG. 1 showing an integrally formed cladding clip structure of the cladding and an integrally formed bracket clip structure of the support bracket both received through a mounting aperture defined in the vehicle body.

With additional reference to FIG. 2, the body cladding 14 has a main panel portion 20 and one or more cladding clip structures 22 extending from the main panel portion 20 (only one cladding clip structure 22 shown in FIG. 2). In particular, the one or more cladding clip structures 22 can be integrally formed with the main panel portion 20 and extend from an attachment or interior surface 24 of the main panel portion 20. The main panel portion 20 can be substantially planar or can be contoured to cover and/or match a significant area or portion of the vehicle body 16, such as the quarter panel area A of the vehicle 12 in FIG. 1. In such a configuration, the body cladding 14 can be referred to as a cladding panel.

As will be described in more detail below, the vehicle body has or defines one or more mounting apertures 26 and each of the cladding clip structures 22 are received through a corresponding one of the mounting apertures 26 in the vehicle body 16. Accordingly, as shown in FIG. 2, the illustrated cladding clip structure 22 is received through the illustrated mounting aperture 26 (i.e., the mounting aperture that corresponds to the cladding clip structure 22) defined in the vehicle body 16 for securing the cladding 14 to the vehicle body 16. Of course, any number of cladding clip structures 22 can be provided on the vehicle cladding 14 and a corresponding number of mounting apertures 26 can be provided in corresponding locations in the vehicle body 16.

As shown, the support bracket 18 has a body portion 30 for overlaying the main panel portion 20 of the body cladding 14 and further has one or more bracket clip structures 32 extending from the body portion 30 (only one bracket clip structure 32 shown in FIG. 2). In particular, the one or more bracket clip structures 32 can be integrally formed with the body portion 30 and extend from an attachment or interior surface 34 of the body portion 30. The body portion 30 of the support bracket 18 can overlay a significant portion of the main panel portion 20 of the body cladding 14 and generally match the contour of the cladding, though this is not required.

Figure 4:
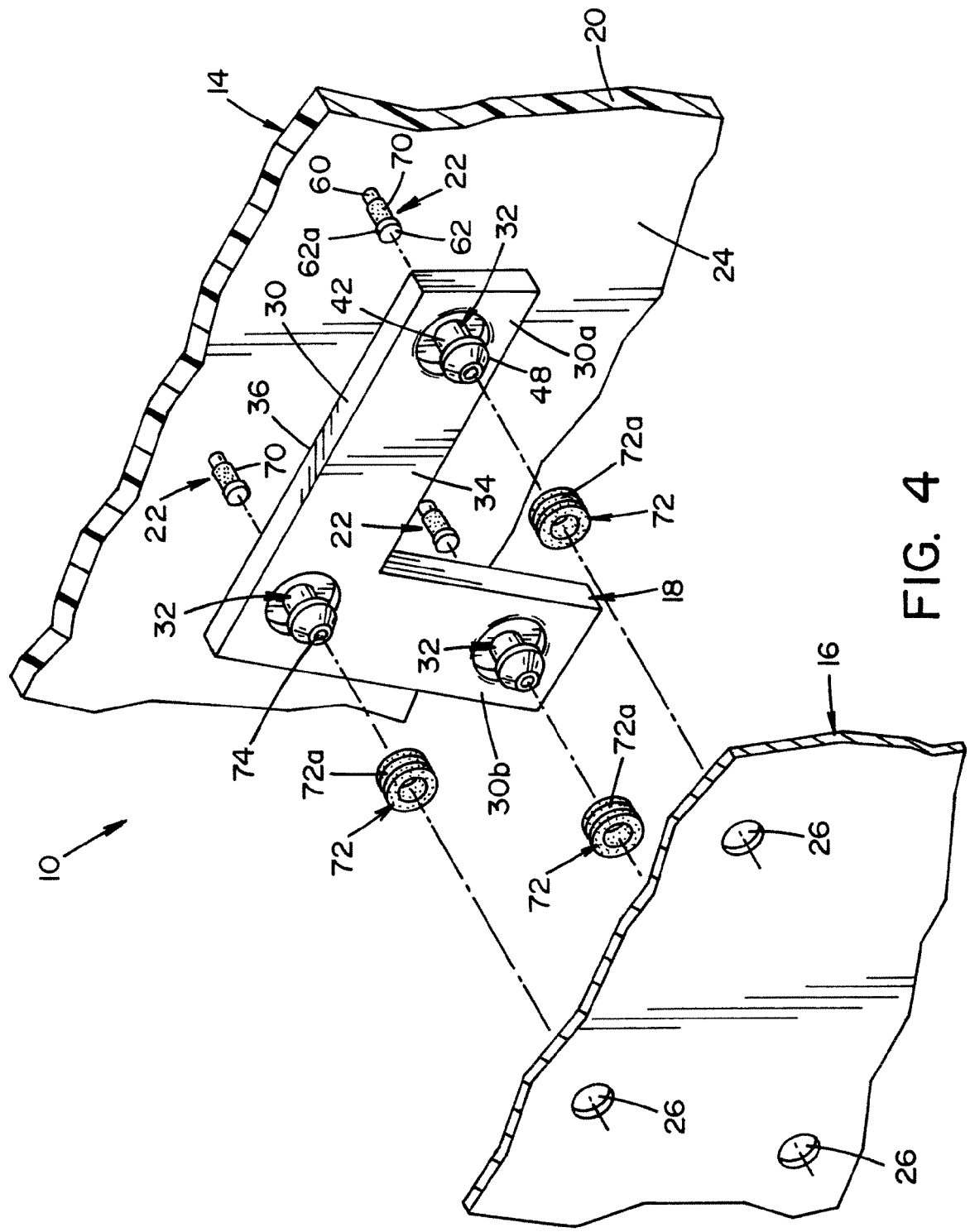
FIG. 4 is a partial exploded perspective view of the mounting arrangement of FIG. 1.

In the illustrated embodiment, with further reference to FIG. 4, the bracket 18, and particularly the body portion 30 thereof, can have an L-shape including a first leg portion 30a, which can extend longitudinally or generally horizontally along the vehicle body 16, and a second leg portion 30b, which can extend generally vertically along the vehicle body 16 and/or can be oriented approximately normal (i.e., 90°) relative to the first leg portion 30a or at a slightly obtuse angle (e.g., about 95°-115°) relative to the first leg portion 30a. The first leg portion 30a also extends along and overlays a portion of the cladding main panel portion 20, as does the second leg portion 30b. The illustrated bracket 18 includes three (3) bracket clip structures 32, including one disposed distally on the leg portion 30a, another disposed distally on the leg portion 30b, and the last disposed at or near an intersecting portion of the legs 30a,30b. Of course, the bracket 30 can have other configurations and need not be configured as shown. Also, more than a single bracket can be used to secure the cladding 14 to the vehicle body 16.

Like the cladding clip structures 22, each of the bracket clip structures 32 is received in a corresponding one of the mounting apertures 26 of the vehicle body 16. More particularly, each mounting aperture 26 can receive a corresponding bracket clip structure 32 therein and also a corresponding cladding clip structure 22 therein. Thus, as shown in FIG. 2, the depicted mounting aperture 26 receives the depicted integrally formed bracket clip structure 32 therein and further receives the depicted integrally formed cladding clip structure 22 therein. The bracket clip structure 32 being receivable in the mounting aperture 26 allows for or enables securing of the cladding 14 to the vehicle body 16 when the cladding clip structure 22 is received in the bracket clip structure 32, particularly in a receiving cavity 40 thereof as will be described in more detail hereafter. For a specific bracket clip structure 22 and a specific cladding clip structure 32 to correspond to a specific mounting aperture 26, they are positioned on their respective bracket 18 and cladding 14 so as to be aligned with the corresponding mounting aperture 26.

More specifically, each bracket clip structure 32 of the support bracket 18 defines a receiving cavity, such as receiving cavity 40, that extends through the body portion 30 and into the bracket clip structure 32. As best shown in FIG. 2, a corresponding cladding clip structure 22 is received in or is receivable within the receiving cavity 40 defined in the bracket clip structure 32 when the cladding clip structure 22 is received in the mounting aperture 26 of the vehicle body 16. In other words, with continuing reference to FIG. 2, the cladding clip structure 22 is received in the mounting aperture 26 of the vehicle body 16 when the bracket clip structure 32 is received in the mounting aperture 26 and the cladding clip structure 22 is received in the receiving cavity 40.

In particular, each of the bracket clip structures 32 includes a cylindrical sleeve or shaft portion 42 extending from the body portion 30 and at least partially defining the receiving cavity 40. The receiving cavity 40 specifically includes a first cavity portion 40a proximal to the body portion 30 and a second cavity portion 40b, which is defined by a head portion 48 of the bracket clip structure 32, distal relative to the body portion 30 and to the first cavity portion 40a. The first cavity portion 40a has a first cavity portion diameter 44 and is at least partially disposed in the cylindrical sleeve portion 42. The second cavity portion 40b has a second cavity portion diameter 46 that is larger than the first diameter 44 of the first cavity portion 40a.

Each of the bracket clip structures 32 further includes the head portion 48 disposed distally on the sleeve portion 42 relative to the body portion 30. The head portion 48 has a head portion diameter 50 and the sleeve portion 42 has a sleeve portion diameter 52. The head portion diameter 50 is larger than the sleeve portion diameter 52 and the first cavity portion 40a. Further, the head portion diameter 50 is greater than a diameter 54 of the corresponding mounting aperture 26 defined in the vehicle body 16. Still further, the diameter 46 of the second cavity portion 40b is greater than the diameter 52 of the shaft portion 42.

Turning to the cladding 14, each of the cladding clip structures 22 includes a shaft portion 60 extending from the main panel portion 20 and a cladding clip head portion 62 disposed distally on the shaft portion 60 relative to the main panel portion 20. The cladding clip head portion 62 has a diameter 64 that is larger than each of a diameter 66 of the shaft portion 60 and the first cavity portion diameter 44 of the first cavity portion 40a. When securing the cladding 14 to the vehicle body 16, the cladding clip head portion 62 is received in the second cavity portion 40b and the shaft portion 60 is received in the first cavity portion 40a (as shown in FIG. 2).

A rubber coating or annular rubber washer 70 can be radially disposed between the cladding clip structure 22 and the bracket clip structure 32. More particularly, as shown in the illustrated embodiment, rubber coating 70 can be radially disposed between the cladding clip shaft portion 60 and the bracket sleeve portion 42 to seal therebetween. Specifically, the rubber coating 70 can be received annularly about the shaft portion 60 so as to form a water tight seal between the shaft portion 60 and an interior surface 42a of the sleeve portion 42 that defines the first cavity portion 40a. One advantage of this arrangement is that rubber coating 70 will thermally expand and contract at a different rate than the cladding 14, particularly the clip structure 22, which will enhance fit and finish of the mounting arrangement 10. Alternatively, though not shown, a rubber coating or annular rubber washer could be radially disposed between the cladding clip head portion 62 and the bracket head portion. In this alternate arrangement, the rubber coating or washer could be received annularly about the head portion 62 so as to form a water tight seal between a radial or peripheral edge 62a of the head portion and an interior surface 48a of the head portion 48 that defines the second cavity portion 40b.

Returning to the illustrated embodiment, an annular grommet 72, such as a rubber washer, can be radially disposed between the cylindrical sleeve portion 42 of the bracket clip structure 32 and the vehicle body 16 defining the mounting aperture 26 to seal therebetween. As shown, the grommet 72 can include a circumferential groove 72a for receiving a portion of the vehicle body 16 that defines the mounting aperture 26 to secure or mount the grommet to the vehicle body.

To facilitate dismounting of the cladding 14 from the vehicle body 16, each bracket clip structure 32, and specifically the head portion 48 of each bracket clip structure 32, can include an aperture 74. In particular, the aperture 74 connects to the receiving cavity 40, and specifically the second cavity portion 40b, to allow forced removal of the cladding clip structure 22 from the receiving cavity 40 of the bracket clip structure 32. More specifically, the aperture 74 allows a removal force to be directly applied to the cladding clip structure 22 from inside the vehicle body 16. For example, a removal tool (e.g., a screwdriver or similar) can be inserted into the aperture 74 to apply a force directly onto the cladding clip structure 22 and force the same out of the receiving cavity 40.

Figure 3:
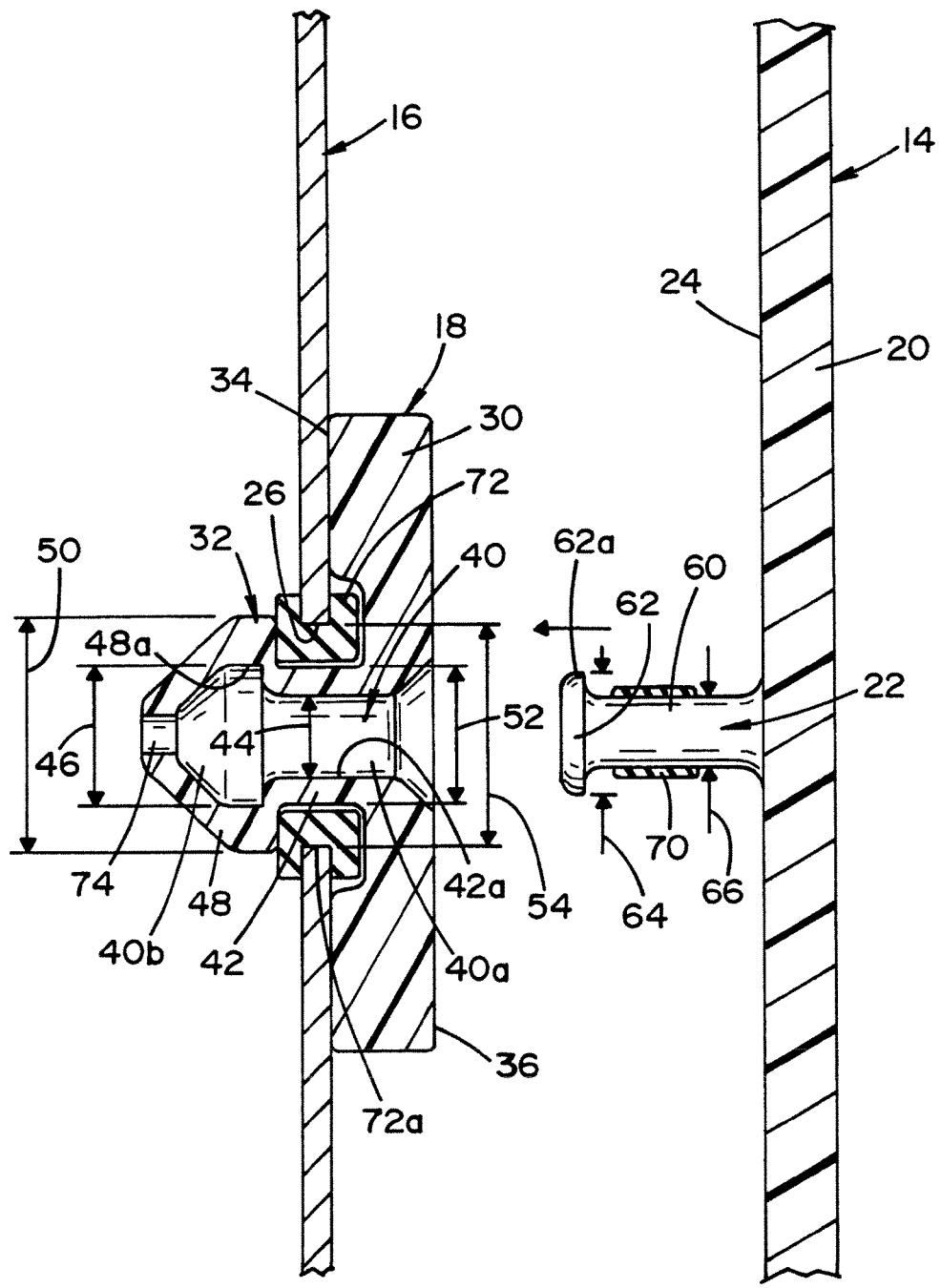
FIG. 3 is a cross sectional view similar to FIG. 2, but showing only the bracket clip structure of the support bracket mounted within the mounting aperture and with the cladding clip structure in the process of being mounted within the mounting aperture and into the bracket clip structure.

As best shown in FIG. 4, the illustrated cladding clip structure 22 of FIGS. 2 and 3 can be one of a plurality of cladding clip structures 22 integrally formed on the main panel portion 20 and extending therefrom. The body cladding 14, which includes the main panel portion 20, can be formed of a plastic material, such as a thermalplastic or thermoset, which enables the cladding clip structures 22 to be integrally formed with the main panel portion 20. Likewise, the bracket clip structure 32 illustrated in FIGS. 2 and 3 can be one of a plurality of bracket clip structures 32 integrally formed on the body portion 30 of the support bracket 18. The support bracket 18 can also be formed of plastic, such as a thermoplastic or thermoset, which enables the bracket clip structures 32 to be integrally formed with the body portion 30 of the bracket 18.

Also as shown in FIG. 4, the mounting aperture 26 of FIGS. 2 and 3 can be one of a plurality of mounting apertures 26 defined in the vehicle body 16. The vehicle body 16 can be any type of vehicle body, such as a sheet metal vehicle body, into which the mounting apertures 26 are defined for receiving the clip structures 22,32 (i.e., double-clip structures 22,32) of the cladding 14 and bracket 18. More particularly, as shown, each of the mounting apertures 26 of FIG. 4 can receive a corresponding one of the plurality of bracket clip structures 32 and a corresponding one of the plurality of cladding clip structures 22 for mounting the cladding 14 to the vehicle body 16.

A method of securing a cladding panel to a vehicle body includes providing a plastic body cladding, such as body cladding 14 with a main panel portion 20 and at least one integrally molded cladding clip structure 22 extending from the main panel portion 20. Rubber washer or coating 70 can be annularly provided on the at least one integrally molded cladding clip structure 22. The method also includes providing a plastic support bracket, such as support bracket 18 having body portion 30, at least one integrally molded bracket clip structure 32 extending from inside surface 34 of the body portion 30, and receiving cavity 40 having one end defined in outside surface 36 of the body portion 30 and extending through the body portion into the bracket clip structure 32. To secure the cladding panel 14 to the vehicle body, such as vehicle body 16, each cladding clip structure 22 of the cladding 14 is inserted into a corresponding receiving cavity 40 of the bracket 18 and each bracket clip structure 32 is inserted into a corresponding mounting aperture 26 defined in the vehicle body 16. In particular, for example, the bracket 18 can be first secured to the body by inserting the bracket clip structures 32 into corresponding mounting apertures 26 and then subsequently the cladding can be secured to the bracket 18 and the body 16 by inserting the cladding clip structure 22, which can have the rubber washer or coating 70 annularly disposed thereabout, into corresponding receiving cavities 40 of the bracket 18.

To remove the cladding 14 from the vehicle body 16, an access opening, such as access opening 74, is provided in each bracket clip structure 32 which allows the application of a force to the cladding clip structure 22 received therein to first remove the cladding clip structure 22 from the receiving cavity 40 and subsequently remove the bracket clip structure 32 from the mounting aperture 26 to thereby remove the cladding 14 from the vehicle body 16.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle cladding mounting arrangement, comprising:
   a plastic body cladding having a main panel portion and an integrally molded cladding clip structure extending from said main panel portion;
   a plastic support bracket having a body portion for overlaying said main panel portion of said body cladding and an integrally formed bracket clip structure extending from said body portion; and
   a vehicle body defining a mounting aperture that receives said integrally molded bracket clip structure therein and further receives said integrally formed cladding clip structure therein for securing said body cladding to said vehicle body, wherein said support bracket defines a receiving cavity that extends through said body portion and into said bracket clip structure, said cladding clip structure received in said receiving cavity when said cladding clip structure is received in said mounting aperture of said vehicle body;

wherein said bracket clip structure includes an aperture having a diameter smaller than the diameter of said receiving cavity wherein said aperture connects to said receiving cavity to allow forced removal of said cladding clip structure from said receiving cavity, said aperture being aligned with said cladding clip structure to allow an associated removal tool to be inserted through said aperture to apply a removal force directly on said cladding clip structure received in said receiving cavity and force said cladding clip structure out of said receiving cavity;

wherein said bracket clip structure includes a cylindrical sleeve portion extending from said body portion and at least partially defining said receiving cavity; and an annular grommet radially disposed between said cylindrical sleeve portion and said vehicle body defining said mounting aperture to seal therebetween, wherein said body portion of said support bracket includes an annular recess formed in an interior surface surrounding said cylindrical sleeve portion and receiving said grommet such than the interior surface of said body portion contacts an exterior surface of said vehicle body.

2. The vehicle cladding mounting arrangement of claim 1 wherein said receiving cavity includes a first cavity portion proximal to said body portion and a second cavity portion distal relative to said body portion and said first cavity portion, said first cavity portion having a first cavity portion diameter and being at least partially disposed in said cylindrical sleeve portion, said second cavity portion having a second cavity portion diameter that is larger than said first diameter.

3. The vehicle cladding mounting arrangement of claim 2 wherein said bracket clip structure further includes a head portion disposed distally on said sleeve portion relative to said body portion, said head portion having a head portion diameter and said sleeve portion having a sleeve portion diameter, said head portion diameter being larger than said sleeve portion diameter.

4. The vehicle cladding mounting arrangement of claim 3 wherein said head portion diameter is greater than a diameter of said mounting aperture defined in said vehicle body.

5. The vehicle cladding mounting arrangement of claim 3 wherein said cladding clip structure includes a shaft portion extending from said main panel portion and a cladding clip head portion disposed distally on said shaft portion relative to said main panel portion, said cladding clip head portion having a diameter that is larger than each of a diameter of said shaft portion and said first cavity portion diameter of said first cavity portion, said cladding clip head portion received in said second cavity portion and said shaft portion received in said first cavity portion.

6. The vehicle cladding mounting arrangement of claim 5 further including a rubber coating radially disposed between said cladding clip shaft portion and said bracket shaft portion defining said first cavity portion to seal therebetween.

7. The vehicle cladding mounting arrangement of claim 2 wherein said cladding clip structure includes a shaft portion extending from said main panel portion and a cladding clip head portion disposed distally on said shaft portion relative to said main panel portion, said cladding clip head portion having a diameter that is larger than each of a diameter of said shaft portion and said first cavity portion diameter of said first cavity portion, said cladding clip head portion received in said second cavity portion and said shaft portion received in said first cavity portion.

8. The vehicle cladding mounting arrangement of claim 1 wherein said cladding clip structure includes a shaft portion extending from said main panel portion and a cladding clip head portion disposed distally on said shaft portion relative to said main panel portion, said cladding clip head portion having a diameter that is larger than a diameter of said shaft portion and larger than at least a portion of said receiving aperture disposed between said head portion and said main panel portion.

9. The vehicle cladding mounting arrangement of claim 8 wherein said bracket clip structure includes an aperture that connects to said receiving cavity allowing a removal force to be directly applied to said cladding clip structure from inside of said vehicle body.

10. The vehicle cladding mounting arrangement of claim 1 wherein said cladding clip structure is one of a plurality of cladding clip structures integrally formed on said main panel portion and extending therefrom, and said bracket clip structure is one of a plurality of bracket clip structures integrally formed on said body portion, said mounting aperture one of a plurality of mounting apertures defined in said vehicle body, each of said mounting apertures receiving a corresponding one of said plurality of bracket clip structures and a corresponding one of said plurality of cladding clip structures.

11. The vehicle cladding mounting arrangement of claim 10 wherein said vehicle body is a sheet metal vehicle body.

12. A double-clip mounting arrangement for securing a cladding to a vehicle body, comprising:
a plastic cladding panel having an integrally molded cladding clip structure;
a support bracket overlaying said cladding panel and having an integrally molded bracket clip structure, said cladding clip structure receivable within a receiving cavity defined in said bracket clip structure; and
a vehicle body having a mounting aperture into which said bracket clip structure is receivable for securing said cladding panel to said vehicle body when said cladding clip structure is received in said receiving cavity of said bracket clip structure,
wherein said bracket clip structure has a bracket clip shaft portion and a bracket clip head portion, said bracket clip head portion having a diameter greater than said bracket clip shaft portion and said mounting aperture, and said cladding clip structure having a cladding clip shaft portion received in a first cavity portion of said receiving cavity and a cladding clip head portion received in a second cavity portion of said receiving cavity, said bracket clip head portion and said second cavity portion each having a diameter greater than each of said first cavity portion and said bracket clip shaft portion.

13. The double-clip mounting arrangement of claim 12 wherein said cladding clip structure is received in said mounting aperture of said vehicle body when said bracket clip structure is received in said mounting aperture and said cladding clip structure is received in said receiving cavity.

14. A vehicle cladding mounting arrangement, comprising:
a plastic body cladding having a main panel portion and an integrally molded cladding clip structure extending from said main panel portion;
a plastic support bracket having a body portion for overlaying said main panel portion of said body cladding, an integrally molded bracket clip structure extending from said body portion, a receiving cavity extending through said body portion and into said bracket clip structure, a cylindrical sleeve portion extending from said body portion and at least partially defining said receiving cavity, and an annular recess formed in an interior surface of said plastic support bracket surrounding said cylindrical sleeve portion, wherein said cladding clip structure is received in said receiving cavity;

a vehicle body defining a mounting aperture that receives said bracket clip structure therein and further receives said cladding clip structure therein; and an annular grommet radially disposed between said cylindrical sleeve portion and said vehicle body received in said annular recess.

15. The vehicle cladding mounting arrangement of claim 14 wherein said bracket clip structure further includes a head portion disposed distally on said cylindrical sleeve portion relative to said body portion, wherein said receiving cavity includes a first cavity portion proximal to said body portion and a second cavity portion distal relative to said body portion and said first cavity portion, said first cavity portion having a first cavity portion diameter and being at least partially disposed in said cylindrical sleeve portion, said second cavity portion having a second cavity portion diameter that is larger than said first diameter, wherein said head portion includes an aperture that connects to said second cavity portion to allow forced removal of cladding clip structure from said receiving cavity, said aperture in said head portion allowing a removal force to be applied on said cladding clip head portion received in said second cavity portion.

16. A vehicle cladding mounting arrangement, comprising:

a vehicle body defining a plurality of mounting apertures;

a plastic body cladding having a main panel portion and a plurality of integrally molded cladding clip structures extending from said main panel portion, each cladding clip structure being received in a respective mounting aperture;

a plastic support bracket having a body portion for overlaying said main panel portion of said body cladding and a plurality of integrally formed bracket clip structures extending from said body portion, wherein said body portion includes a first leg extending generally horizontally along said vehicle body and a second leg extending generally vertically along said vehicle body, wherein said plurality of bracket clip structures includes a first clip structure disposed distally on said first leg, a second clip structure disposed distally on said second leg and a third clip structure disposed at or near an intersecting portion of said legs, each bracket clip structure being received in a respective cladding clip structure and a respective mounting aperture, wherein said bracket clip structure has a bracket clip shaft portion and a bracket clip head portion, said bracket clip head portion having a diameter greater than said bracket clip shaft portion and said mounting aperture, and said cladding clip structure having a cladding clip shaft portion received in a first cavity portion of said receiving cavity and a cladding clip head portion received in a second cavity portion of said receiving cavity, said bracket clip head portion and said second cavity portion each having a diameter greater than each of said first cavity portion and said bracket clip shaft portion.

17. The vehicle cladding mounting arrangement of claim 16 wherein said bracket clip structure further includes a head portion disposed distally on said cylindrical sleeve portion relative to said body portion, wherein said receiving cavity includes a first cavity portion proximal to said body portion and a second cavity portion distal relative to said body portion and said first cavity portion, said first cavity portion having a first cavity portion diameter and being at least partially disposed in said cylindrical sleeve portion, said second cavity portion having a second cavity portion diameter that is larger than said first diameter, wherein said head portion includes an aperture that connects to said second cavity portion to allow forced removal of cladding clip structure from said receiving cavity, said aperture in said head portion allowing a removal force to be applied on said cladding clip head portion received in said second cavity portion.

* * * * *